United States Patent [19]

Ayache et al.

[11] 4,320,903
[45] Mar. 23, 1982

[54] LABYRINTH SEALS

[75] Inventors: Michel R. Ayache, Epinay sous Senart; Pierre A. Glowacki, Melun; Gérard M. F. Mandet, Epinay sous Senart, all of France

[73] Assignee: Societe Nationale d'Etude et de Construction de Moteurs d'Aviation, Paris, France

[21] Appl. No.: 79,433

[22] Filed: Sep. 27, 1979

[30] Foreign Application Priority Data

Sep. 27, 1978 [FR] France .................. 78 28166

[51] Int. Cl.³ .................. F01D 5/08; F16J 15/44
[52] U.S. Cl. .................. 277/22; 277/53; 415/110; 415/174; 415/176; 415/178; 415/180
[58] Field of Search .................. 277/3, 53, 54-57, 277/29, 22, 133, 134; 415/110, 111, 112, 170 R, 172 R, 172 A, 174, 175, 176, 177, 178, 180, 179

[56] References Cited

U.S. PATENT DOCUMENTS

| 2,891,808 | 6/1959 | Richardson | 415/110 X |
| 3,339,933 | 9/1967 | Foster | 277/53 |
| 3,603,599 | 9/1971 | Laird | 277/53 |
| 3,679,217 | 7/1972 | Lesiecki | 277/3 |
| 3,756,020 | 9/1973 | Moskowitz et al. | 415/176 X |
| 3,836,156 | 9/1974 | Dunthorne | 277/53 |
| 3,989,410 | 11/1976 | Ferrari | 415/175 X |
| 4,190,397 | 2/1980 | Schilling et al. | 415/112 |

FOREIGN PATENT DOCUMENTS

| 493180 | 3/1930 | Fed. Rep. of Germany | 277/55 |
| 677118 | 12/1929 | France | 277/53 |
| 1167380 | 7/1958 | France | 277/53 |
| 1492590 | 7/1967 | France . | |
| 2198054 | 3/1974 | France . | |
| 2216443 | 8/1974 | France . | |
| 162075 | 4/1921 | United Kingdom | 277/53 |
| 775057 | 5/1957 | United Kingdom . | |
| 916150 | 1/1963 | United Kingdom | 277/133 |
| 1248198 | 9/1971 | United Kingdom . | |
| 1484288 | 9/1977 | United Kingdom . | |

OTHER PUBLICATIONS

"Advanced Seal Technology", Technical Report AFAPL-TR-72-8, Feb. 1972, Air Force Aero Propulsion Laboratory, Air Force Systems Command, Wright-Patterson Air Force Base, Ohio 45433, front page and p. 59.

Primary Examiner—Robert S. Ward, Jr.
Attorney, Agent, or Firm—Oblon, Fisher, Spivak, McClelland & Maier

[57] ABSTRACT

A labyrinth seal mounted between a shaft and the casing of a gas turbine combustion chamber, wherein the support of an abradable sealing surface in the seal which operates in conjunction with rapidly rotating fins is cooled by an upstream airflow parallel to the envelope surface of the extremities of such fins and opening into an upstream space. The cooling air is taken in from the casing by means of a conduit which is connected with an overflow valve tied to the gas turbine load. The invention is applicable to aviation turbojets.

8 Claims, 3 Drawing Figures

LABYRINTH SEALS

BACKGROUND OF THE INVENTION

1. Field of the Invention

The present invention relates generally to labyrinth seals and concerns, more particularly, improvements for labyrinth seals that separate two spaces containing fluids at different pressures and which comprise small fins in rapid motion with respect to elements of the seal that operate in conjunction with them, such as, for example, a seal placed between a shaft and the combustion chamber housing of a gas turbine or of an aviation turbojet.

2. Description of the Prior Art

Such a seal as characterized herein separates an upstream space, which contains air at the exhaust pressure of the last compression stage of the turbojet or of the gas turbine set, such as 20 bar at full load, from a downstream space which connects to the first mobile turbine blading, at a pressure such as 10 bar, for example. The efficiency of the turbine is highly sensitive, however, to the rate of flow of the air input at its first blading (for example, introduction of such an air flow that is equal to 1% of the air expelled by the compressor can cause a 1.5% reduction in the turbine output). It is therefore essential that the labyrinth seal be highly efficacious, i.e., that the clearance between the fins and the corresponding elements of the seal be kept very small, which requires a very precise adjustment of their relative shift during the operation of the turbo-engine.

The main cause of deformation is of thermal origin. In fact, it has been observed that the elements of the seal, which operate in conjunction with the fins, heat up during the operation and tend to dilate more downstream than upstream. This is a fairly unexpected phenomenon, for one would rather expect that the air expansion at passage through the seal might produce a cooling effect. One explanation of this phenomenon is that the air is heated by the stirring and lamination between the fins and the corresponding elements of the seal as the air flows downstream. It goes without saying, however, that the invention is in no way limited by scientific hypotheses or explanations.

SUMMARY OF THE INVENTION

An object of the invention, therefore, is to provide a labyrinth seal device of the character described that ensures the adjustment of the relative shifts between the fins and the corresponding elements of the seal.

Another object of the invention is to provide a labyrinth seal in which the support of the seal elements corresponding to the fins maintains to a considerable degree its geometric shape while expanding and contracting thermally during the operation.

In accordance with the present invention, the support of the elements of the seal that correspond to the fins is cooled by air flowing upstream in parallel relation to the envelope surface of the extremities of the fins and emerging in the upstream space, the cooling air being provided by an air source at a higher pressure than that of the downstream space.

Naturally, the tendency of the seals to heat up can vary according to the operating conditions. In order to permit a very fine adjustment of the relative shifts of the fins and their corresponding elements in the seal under all operating conditions and, in particular, under transient operation, the flow of cooling air is advantageously fed by a conduit connected, on the one hand, with the source of air under pressure and, on the other hand, with an overflow valve whose aperture is adjustable. Preferably, the overflow valve is controlled automatically so that it will open as the velocity decreases. In the case where the seal is mounted on a turbo-engine, the overflow valve can be tied to the operating load of the turbo-engine.

In the case where the labyrinth seal is disposed between a shaft and the combustion chamber housing of a gas turbine or of an aviation turbojet, it is advantageous that the internal space of this housing constitute the source of air under pressure.

BRIEF DESCRIPTION OF THE DRAWINGS

Other objects, features and attendant advantages of the present invention will be more fully appreciated as the same becomes better understood from the following detailed description when considered in connection with the accompanying drawings, wherein like reference numerals designate like or corresponding parts throughout the several views, and wherein.

DETAILED DESCRIPTION OF THE PREFERRED EMBODIMENTS

Figure 1:
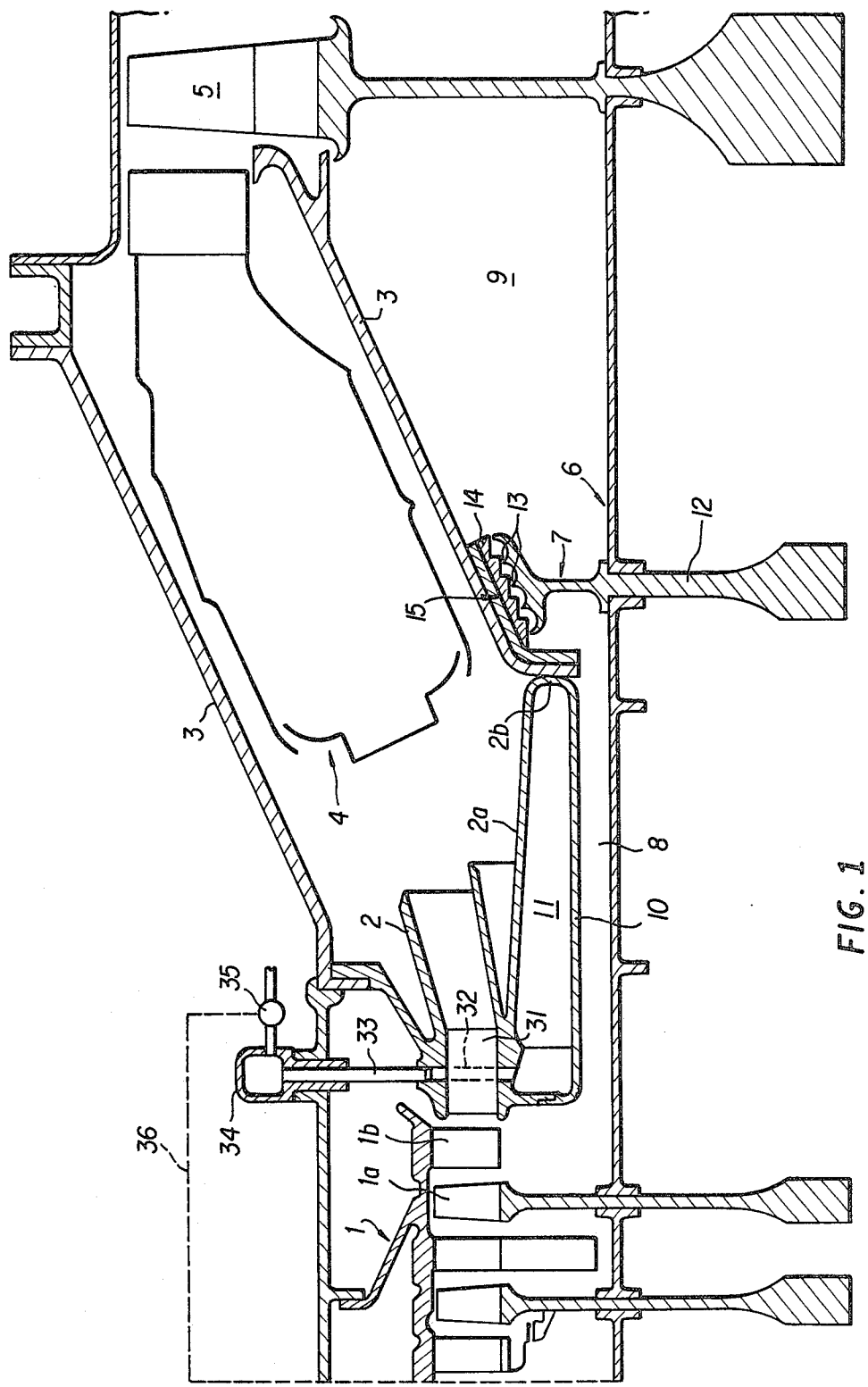
FIG. 1 is a longitudinal half-section of a part of an aviation turbojet comprising a labyrinth seal between a shaft and the housing of a combustion chamber formed according to the present invention.

Referring now to the drawings, and more particularly to FIG. 1 thereof, the turbojet is seen as comprising a compressor 1 which expels compressed air into a diffuser 2 opening up into a ring-shaped housing 3 containing a combustion device 4. The combustion device may be a ring-shaped combustion chamber or may comprise several combustion chambers in crown configuration in which a fuel is burned to generate hot gases which drive a turbine whose first mobile blading is represented by the reference numeral 5. The mobile bladings of the compressor are connected with those of the turbine by a hollow shaft 6 which transmits the rotation from the latter to the former. The hot gases issuing from the turbine are expelled into the air by a nozzle, not shown, so as to form a propulsive jet.

The imperviousness between the shaft 6 and the housing 3 is assured, in line with the combustion chamber 4, by a labyrinth seal, which separates an upstream space 8, connected with the exit of the last blading of the compressor 1a, from a downstream space 9, connected with the entrance to the first turbine blading 5. When the turbojet is rotating at full speed, the static air pressure is in the order of 20 bar in the upstream space 8, 10 bar in the downstream space 9 and 25 bar in the housing 3.

The diffuser 2 is rigidly connected with a wall section 2a of the housing 3, the wall section being terminated by a flange 2b, and the latter is connected to the anterior portion of the diffuser 2 by a wall 10 which, together with wall section 2a, forms a ring-shaped exhaust cavity whose purpose will be described below.

Figure 2:
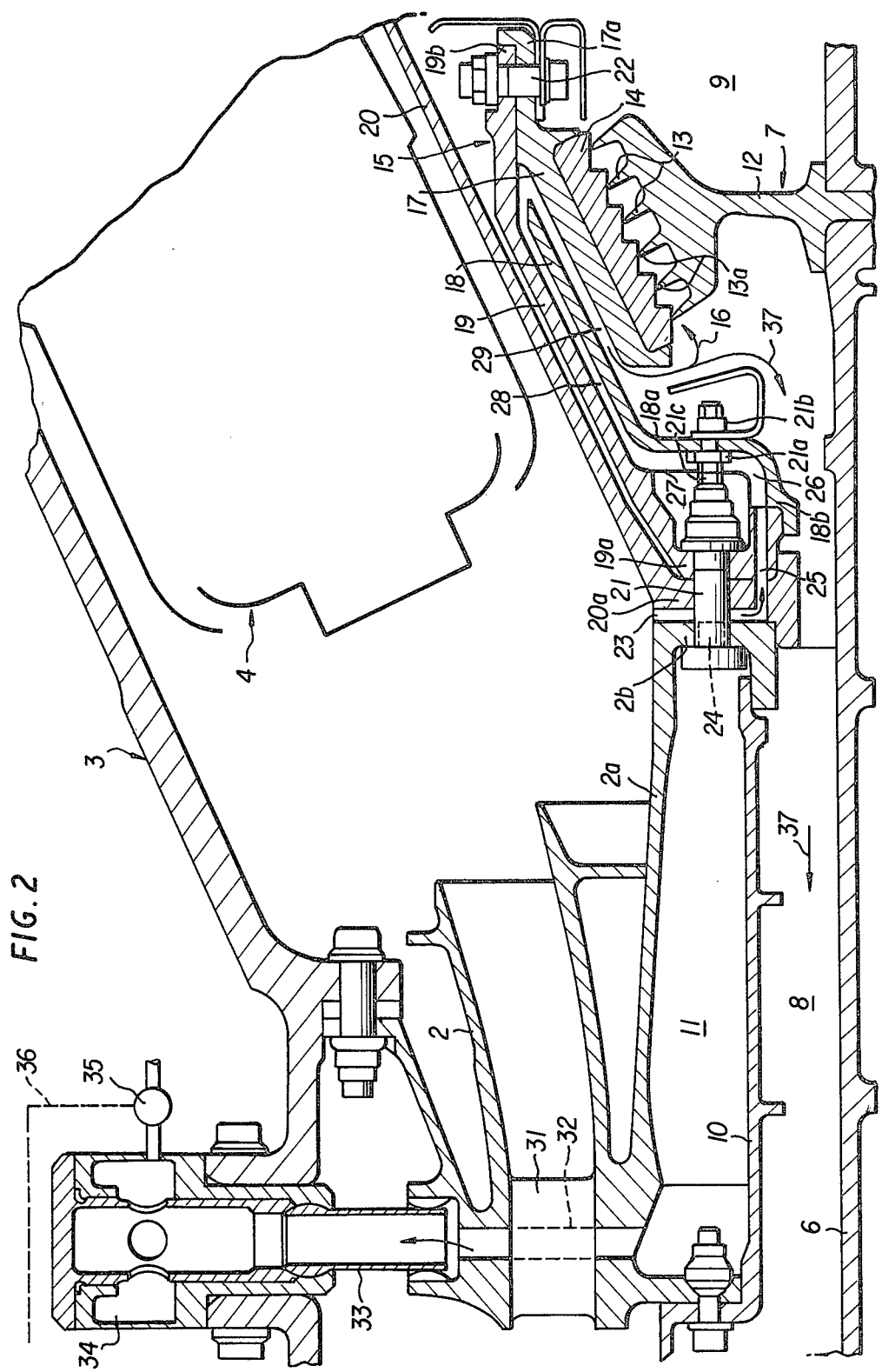
FIG. 2 is a view similar to that of FIG. 1, showing the labyrinth seal and its cooling system on a larger scale.

The labyrinth seal 7 is constituted, as shown also in FIG. 2, by a wheel 12 mounted on the shaft 6 and equipped at its periphery with a series of fins 13 which operate in conjunction with a sealing surface 14, called "abradable" and made of a honeycomb material designed to be worn down by the friction of the fins 13 acting thereon. This "abradable" sealing surface 14 is mounted in familiar fashion on a support 15, called an "abradable carrier", which, in turn, is mounted on the wall of the housing 3. As can be observed in the drawings, the "abradable" sealing surface 14 and the "abradable carrier" 15 follow the generally conical shape of the wall of the housing 3.

Figure 3:
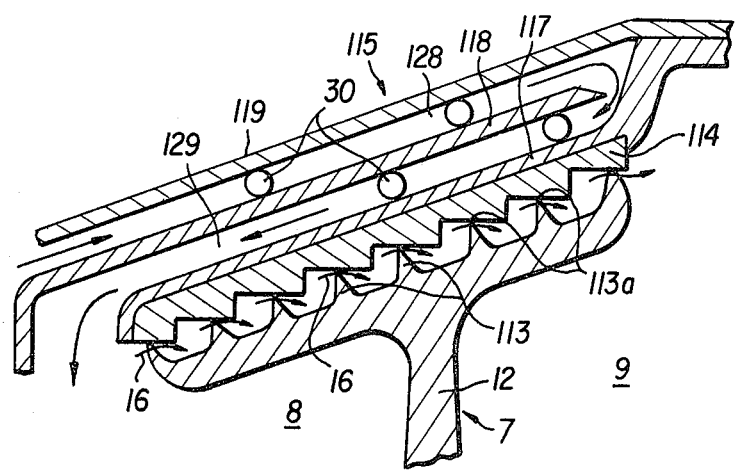
FIG. 3 is a view on an even larger scale of the labyrinth seal, in a somewhat different embodiment.

When the turbojet is in operation, a slight portion of the air in space 8 flows toward space 9 by passing along the arrows 16 as shown in FIG. 3, between the fins 113 and the "abradable" sealing surface 114. The "abradable" sealing surface 114 and the "abradable carrier" 115 tend to heat up more downstream than upstream. If this tendency were not counteracted, the conicity of the "abradable" sealing surface and of the "abradable carrier" would increase at full load, resulting in an increased clearance between the fins and the "abradable" sealing surface.

In order to compensate for this tendency, the "abradable carrier" is made of three conical sleeves 117, 118, and 119 that are parallel to the external surface of the "abradable" sealing surface 114 (itself being parallel to the envelope surface of the extremities 113a of the fins 113) and leave between each other passages through which the cooling air flows in such a manner that the outside surface of sleeve 117, which directly carries the "abradable" sealing surface 114, is licked by the air flowing upstream, i.e., in counter-current relation to the air which flows from the space 8 to the space 9 between the fins 113 and the "abradable" sealing surface 114, the flow rate of the cooling air being adjusted in accordance with the load of the turbojet, as will be explained below. This disposition makes it possible to achieve a nearly uniform temperature for the sleeve 117 and thus to limit the relative deformations and the radial clearance intervals between the fins and the "abradable" sealing surface, and this is true at all turbojet loads.

The inside conical wall 20 of the housing 3 as shown in FIG. 2 is equipped at its base with a flange 20a which adapts to the flange 2b of the wall 2a, and the conical sleeve 19 of the "abradable carrier" 15 is provided at its small base with a flange 19a which fits against flange 20a. These three flanges 2b, 20a and 19a are mounted together by bolts 21 disposed in a crown. The large bases of the conical sleeves 17 and 19 are joined to cylindrical portions 17a and 19b, which are secured together by bolts 22. The small base of the conical sleeve 18 is provided with a flange 18b which adjusts to the inside edge of flange 19a, and the flange 18a is pressed between nuts 21a, 21b screwed onto extensions of the bolt 21.

The flange 20a is provided with a multiplicity of radial canals 23 opening into the housing 3 and passing between the bolts 21. These canals 23 are connected upstream with the cavity 11 by means of holes 24 through the flange 2b, and downstream with holes 25 through the flanges 20a and 19a. These holes 25 open up, between the flanges 19a and 18a, into an annular passage 26 comprised between the flange 18a and a sheet-metal shield 27 pressed between the nut 21a and a ring 21c around the shaft of the bolt 21. The annular passage 26 is connected with the conical spacing 29 between the sleeves 18 and 19, which is connected, by winding around the large base of the conical sleeve 18, with the conical spacing 28 between the latter and the sleeve 17. The spacings between the sleeves are maintained by spacers constituted, e.g., by ball bearings 30 as shown in FIG. 3 or by segments of calibrated wire, welded to the sleeves. These spacers are not shown in FIG. 2, but can be seen in FIG. 3, where elements playing the same part as in FIG. 2 are designated by the same reference numbers, to which 100 has been added.

The diffuser 2 is traversed by a multiplicity of radial arms 31 at equal angular intervals, such arms being in turn traversed radially by passages 32. One can also conceive that these radial arms be constituted by rectifier bladings, eliminating the need for the shield 1b shown in FIG. 1, these radial bladings being traversed in similar manner by passages 32. The passages 32 are connected, e.g., by means of articulated tubes 33, with ball-and-socket joints at both ends, with an annular collector 34 which opens up into the atmosphere through an overflow valve 35, ties to the turbojet load by means indicated schematically in FIG. 1 by a connection 36 to the shaft 6.

The cooling air is taken in by the canal 23 in the housing 3 of the combustion chamber, where it is under a pressure of 25 bars. This disposition is preferred to the more prevalent disposition in which the air is taken in upstream of the last rectifier 1b of the compressor 1 (FIG. 1), because contrary to what might be expected, the temperature of the air in the housing is considerably lower than the air temperature upstream of rectifier 1b. In the example presented here, where there is a pressure of 25 bars in the housing, this difference in temperature is about 50°. A portion of the air thus taken from the housing through canal 23 flows through the holes 24 into the exhaust cavity 11, and from there through the passages 32 and the tubes 33 into the collector 34, from where it escapes into the atmosphere through the overflow valve 35 when the latter is at least partially open. The remainder of the air flows through the passages 25 and 26 into the spacing 28, where it flows downstream, winds around the extremity of the sleeve 18 and flows upstream in the spacing 29, licking and cooling the outside conical surface of the sleeve 17. It is appropriate to note that, owing to the fact that the cooling air passage formed by the spacing 29 is parallel to the conical envelope of the extremities 13a of the fins, it is possible to give the sleeve 17 a constant thickness over its entire length. It is this disposition, together with the countercurrent flow of the cooling air, which allows the sleeve 17 to remain parallel to itself in the course of its thermal expansions and contractions. It should be noted also, that it is because of the configuration which discharges the cooling air into the upstream space 8 that it is possible to make it circulate in parallel relation to the envelope surface of the extremities of the fins.

The air, having thus cooled the sleeve 17, emerges into the space 8 against the upstream extremity of the "abradable" sealing surface 14, at a pressure still slightly above that of space 8. The major part of this air (75%, approximately) crosses the labyrinth of seal 7 along the arrow 16, and the remainder flows along the arrow 37 toward the upstream section of space 8, and is re-introduced into the compressor vein upstream of the last distributor 1b.

When the turbojet is operating at full load, the overflow valve 35 is closed, so that all of the air taken in through the canal 23 serves to cool the seal. During a deceleration, the valve 35 opens as the velocity decreases until it is fully open at slow speed, thus opening to the air in the canal 23 a more permeable passage than the one through the "abradable carrier" 15. At low velocity, the totality of the air, instead of forcing its way through the "abradable carrier", escapes into the atmosphere through the open overflow valve 35.

It goes without saying that the embodiment described here is only one example and that it can be modified, in particular through the substitution of equivalent techniques, without departing from the framework of the invention. In particular, the invention does not apply solely to a conical "abradable carrier", as it would be just as valid for a differently shaped "abradable carrier", e.g., a cylindrical one. On the other hand, in the case of a twin-flow turbojet, the overflow valve could open up into the second flow.

Accordingly, other modifications and variations are possible in light of the above teachings and, within the scope of the appended claims, it is to be understood that the invention may be practiced otherwise than as specifically described herein.

What is claimed as new and desired to be secured by Letters Patent of the United States is:

1. A cooling device for a labyrinth seal mounted on a shaft connecting an air compressor to a gas turbine in order to separate the air space, or upstream space, from the gas space, or downstream space, said seal comprising fins carried by said shaft and rapidly rotatable with respect to a static wear surface mounted on a support, comprising means defining an annular canal surrounding said support of the wear surface of the seal, said canal having the same form of revolution as the envelope of the fins of said seal and being connected by its downstream extremity to an air intake provided in the wall of the casing of a combustion chamber of said turbine, with its other extremity open upstream of the seal into a lower-pressure air space which surrounds said shaft of said compressor.

2. A cooling device for a labyrinth seal mounted on a shaft connecting an air compressor to a gas turbine having a combustion chamber with a casing in order to separate the air space, or upstream space, from the gas space, or downstream space, said seal comprising fins carried by said shaft and rapidly rotatable with respect to a static wear surface mounted on a support, said cooling device comprising:

means for air intake formed in a wall portion of said casing;

means defining an annular canal surrounding said support of said wear surface of said seal;

said canal defining the same form of revolution as the envelope of the fins of said seal and being connected at an upstream portion thereof to said air intake means formed in said wall portion of said casing of said combustion chamber of said turbine, with a downstream portion thereof open upstream of said seal into a lower-pressure air space which surrounds said shaft of said compressor; and an overflow valve with an adjustable aperture and means connecting said air intake to said overflow valve such that said annular canal channels coolant over said support in an upstream direction.

3. A device in accordance with claim 1 or 2 wherein said annular canal channels coolant in an upstream counter-current direction such that said support remains parallel to itself in the course of thermal expansions and contractions of said support, thereby maintaining a near uniform clearance between said fins and said wear surface of said seal.

4. A device in accordance with claim 2, further comprising means for controlling automatically said overflow valve so as to open said valve wider as the velocity decreases.

5. A device in accordance with claim 4, wherein the discharge is tied to the load on said gas turbine.

6. A device in accordance with claim 4, 5 or 2 wherein said overflow valve discharges into the atmosphere.

7. A device in accordance with claim 4, 5 or 2 applied to a twin-flow aviation turbojet, wherein the overflow valve opens up into the second flow.

8. A device in accordance with claim 4, 5 or 2 applied to an aviation turbojet.

* * * * *